United States Patent
Vasseur et al.

(10) Patent No.: US 9,124,482 B2
(45) Date of Patent: Sep. 1, 2015

(54) DELAY BUDGET BASED FORWARDING IN COMMUNICATION NETWORKS

(75) Inventors: Jean-Philippe Vasseur, Saint Martin Duriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 813 days.

(21) Appl. No.: 13/185,805

(22) Filed: Jul. 19, 2011

(65) Prior Publication Data
US 2013/0022042 A1    Jan. 24, 2013

(51) Int. Cl.
| | | |
|---|---|---|
| H04L 12/875 | (2013.01) | |
| H04L 12/751 | (2013.01) | |
| H04W 72/12 | (2009.01) | |
| H04L 12/727 | (2013.01) | |
| H04L 12/26 | (2006.01) | |
| H04W 72/04 | (2009.01) | |
| H04L 12/823 | (2013.01) | |

(52) U.S. Cl.
CPC ............... *H04L 45/02* (2013.01); *H04L 43/08* (2013.01); *H04L 45/121* (2013.01); *H04L 47/56* (2013.01); *H04W 72/12* (2013.01); *H04L 12/2602* (2013.01); *H04L 47/32* (2013.01); *H04W 72/048* (2013.01)

(58) Field of Classification Search
CPC ......... H04L 45/02; H04L 45/22; H04L 41/12; H04L 45/48; H04L 12/2608; H04L 43/08; H04L 47/32; H04L 47/56; H04W 84/18; H04W 72/12; H04W 72/048
See application file for complete search history.

(56) References Cited

U.S. PATENT DOCUMENTS

| | | |
|---|---|---|
| 5,088,032 A | 2/1992 | Bosack |
| 6,724,721 B1 | 4/2004 | Cheriton |
| 6,859,460 B1 | 2/2005 | Chen |
| 6,957,071 B1 | 10/2005 | Holur et al. |
| 7,027,456 B1 | 4/2006 | Chen |
| 7,079,512 B1 | 7/2006 | Alam et al. |
| 7,496,078 B2 | 2/2009 | Rahman |
| 7,539,499 B2 | 5/2009 | Holur et al. |
| 7,630,312 B1 | 12/2009 | Cheriton |
| 7,733,769 B1 | 6/2010 | Jennings et al. |
| 7,768,923 B2 | 8/2010 | Kumar et al. |
| 2002/0187799 A1* | 12/2002 | Haartsen ........................ 455/509 |
| 2006/0112168 A1* | 5/2006 | Albers et al. .................. 709/213 |

(Continued)

OTHER PUBLICATIONS

"RPL: IPv6 Routing Protocol for Low Power and Lossy Networks" <draft-ietf-roll-rpl-19> by Winter, at al. (Mar. 13, 2011 version).

*Primary Examiner* — Andrew Chriss
*Assistant Examiner* — Salvador E Rivas
(74) *Attorney, Agent, or Firm* — Parker Ibrahim & Berg LLC; James M. Behmke; Stephen D. LeBarron

(57) ABSTRACT

In one embodiment, certain nodes in a computer network maintain a plurality of routing topologies, each associated with a different corresponding delay (e.g., dynamically adjusted). Upon receiving a packet with an indicated delay budget at a particular node, the node updates the delay budget based on an incurred delay up to and including the particular node since the indicated delay budget was last updated, and selects a particular routing topology on which to forward the packet based on the updated delay budget and the corresponding routing topology delays. The packet may then be forwarded with the updated delay budget on the selected routing topology, accordingly.

20 Claims, 12 Drawing Sheets

(56) References Cited

U.S. PATENT DOCUMENTS

| | | | |
|---|---|---|---|
| 2006/0268713 A1* | 11/2006 | Lundstrom | 370/235 |
| 2007/0019552 A1* | 1/2007 | Senarath et al. | 370/235 |
| 2010/0138527 A1* | 6/2010 | Liu | 709/223 |
| 2011/0125921 A1* | 5/2011 | Karenos et al. | 709/240 |
| 2011/0292797 A1* | 12/2011 | Bejerano | 370/230.1 |

* cited by examiner

DELAY BUDGET BASED FORWARDING IN COMMUNICATION NETWORKS

TECHNICAL FIELD

The present disclosure relates generally to computer networks, and, more particularly, to delay sensitivity for message forwarding in computer networks.

BACKGROUND

Existing proprietary systems used in the Smart Grid space are closed and typically only support a single application. As a result, users and operators must deploy multiple networks to support multiple applications (e.g., one network for Automated Meter Reading (AMR), another network for Distribution Automation, etc.). In contrast, the Internet Protocol (IP) is an open standard that is designed to support multiple applications simultaneously. As a result, one of the main benefits of utilizing an IP architecture in the Smart Grid is the ability to provide multi-service networks carrying multiple simultaneously traffic flows with different Service Level Agreements (SLAs).

Existing IP networks share a routing topology across the entire Class of Service (CoS) range. In particular, packets are marked using the IPv6 Traffic Class field or Multi-Protocol Label Switching (MPLS) "EXP" field by the source node or the entry node (e.g., border router or gateway) in the network using access control lists (ACLs) or deep packet inspection. The IP packet is then routed along the routing topology and the packet is queued at each hop in the corresponding queue. The link bandwidth is shared across the queues and the queues are serviced according to the particular scheduling algorithms configured for each CoS. In addition, other congestion avoidance techniques are used to handle random packet drops so as trigger various back-off mechanisms.

As an example, delay sensitive traffic may be assigned to a specific CoS. Packets marked with the delay-sensitive CoS are queued at each hop in a queue that is provisioned according to the targeted SLA. While the CoS mechanism is general and has been applied successfully in many Service Providers and large enterprise networks, there are some drawbacks. The CoS mechanism requires heavy engineering techniques and a deep understanding of the network behavior in terms of applications, network topology, traffic matrix to provision the network and make effective use of the CoS. Furthermore, in current networks, the required delay is not explicitly carried in the packet itself; rather a CoS is indicated (an integer) that translates into a order of priority, which can hardly be mapped to the actual delay requirement for the packet.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
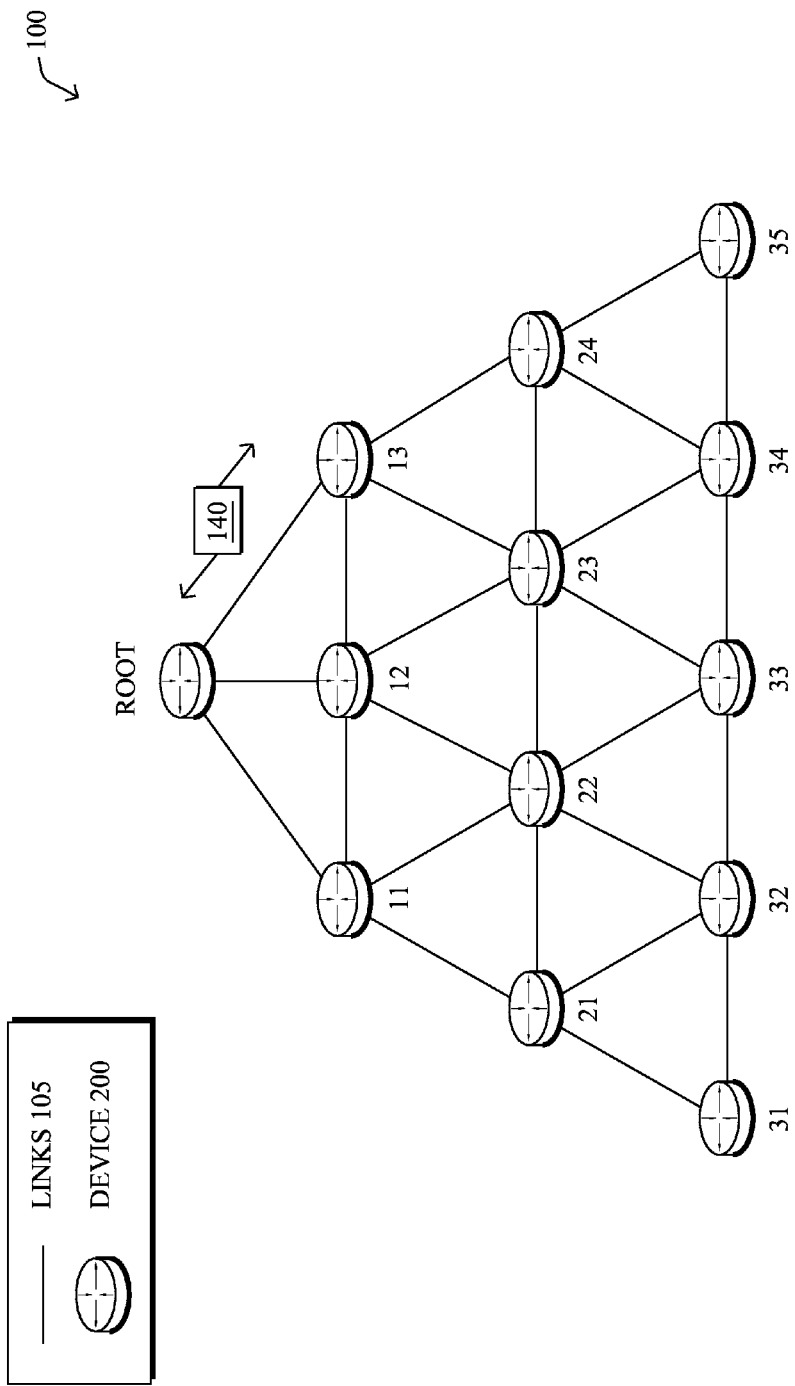
FIG. 1 illustrates an example computer network.

According to one or more embodiments of the disclosure, certain nodes in a computer network maintain a plurality of routing topologies, each associated with a different corresponding delay (e.g., dynamically adjusted). Upon receiving a packet with an indicated delay budget at a particular node, the node updates the delay budget based on an incurred delay up to and including the particular node since the indicated delay budget was last updated, and selects a particular routing topology on which to forward the packet based on the updated delay budget and the corresponding routing topology delays. The packet may then be forwarded with the updated delay budget on the selected routing topology, accordingly.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "35," and described in FIG. 2 below) interconnected by various methods of communication. For instance, the links 105 may be wired links, or else a type of shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
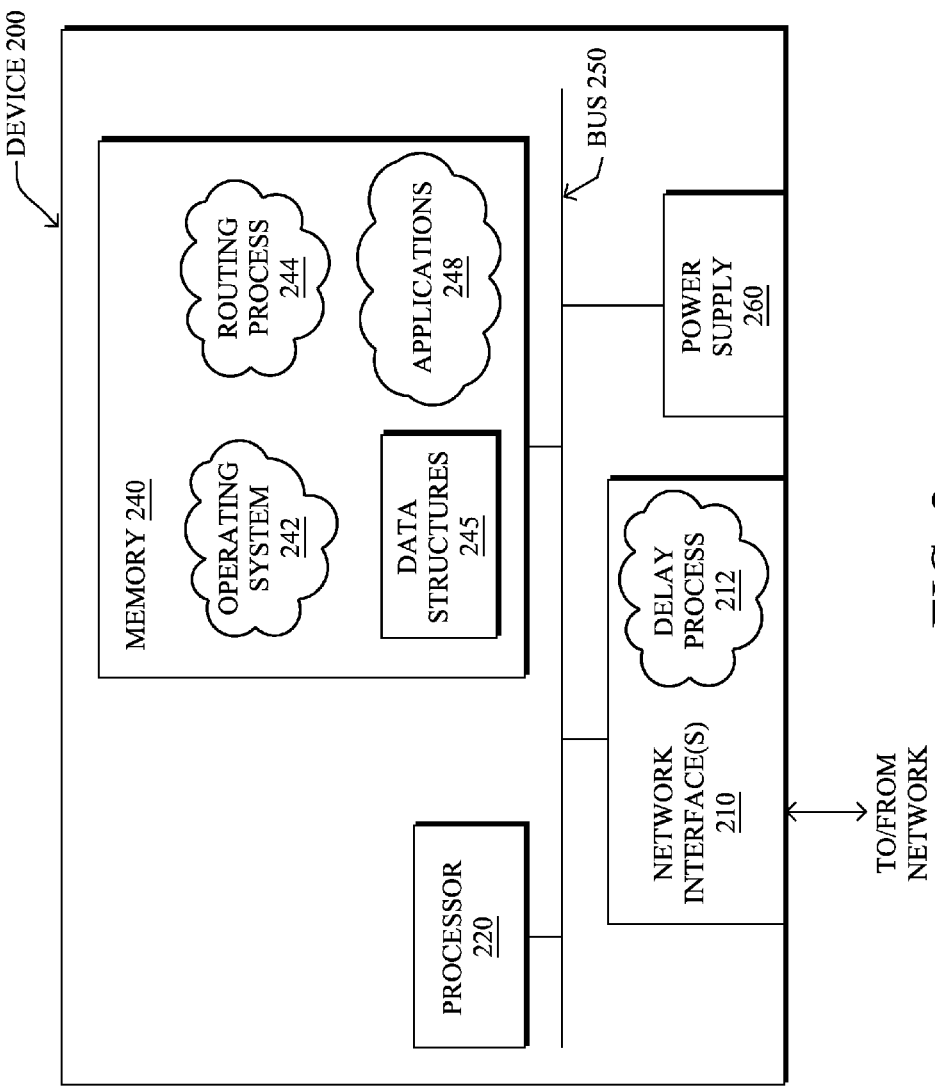
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. In addition, the interfaces 210 may comprise a media access control (MAC) layer module, as well as other layers, such as the physical or "PHY" layer, as will be understood by those skilled in the art. Generally, for purposes of illustration herein, a simplified "delay process" 212 has been shown. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, other various protocol specific processes, and one or more illustrative applications 248 that may generate delay sensitive packets, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/ devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a DAG is a directed graph having the property that all edges (and/or vertices) are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

As noted above, existing proprietary systems used in the Smart Grid space are closed and typically only support a single application. As a result, users and operators must deploy multiple networks to support multiple applications (e.g., one network for Automated Meter Reading (AMR), another network for Distribution Automation, etc.). In contrast, the Internet Protocol (IP) is an open standard that is designed to support multiple applications simultaneously. As a result, one of the main benefits of utilizing an IP architecture in the Smart Grid is the ability to provide multi-service networks carrying multiple simultaneously traffic flows with different Service Level Agreements (SLAs).

Existing IP networks share a routing topology across the entire Class of Service (CoS) range. In particular, packets are marked using the IPv6 Traffic Class field or Multi-Protocol Label Switching (MPLS) "EXP" field by the source node or the entry node (e.g., border router or gateway) in the network using access control lists (ACLs) or deep packet inspection. The IP packet is then routed along the routing topology and the packet is queued at each hop in the corresponding queue. The link bandwidth is shared across the queues and the queues are serviced according to the particular scheduling algorithms configured for each CoS. In addition, other congestion avoidance techniques are used to handle random packet drops so as trigger various back-off mechanisms.

As an example, delay sensitive traffic may be assigned to a specific CoS. Packets marked with the delay-sensitive CoS are queued at each hop in a queue that is provisioned according to the targeted SLA. While the CoS mechanism is general and has been applied successfully in many Service Providers and large enterprise networks, there are some drawbacks. The CoS mechanism requires heavy engineering techniques and a deep understanding of the network behavior in terms of applications, network topology, traffic matrix to provision the network and make effective use of the CoS.

Note that the bandwidth allocation to each queue is often allocated in a static fashion (except for one/two optional preemptive queue), and traffic classification is performed according to network administrator rules. Furthermore, the CoS serves as an intermediate mapping between the application and the choice of forwarding/routing behavior in the network. As a result, not only must the network be configured to understand the CoS mechanisms, but also the application whereby CoS-to-application mapping involves complex tasks at the edge of the network. In particular, the CoS does not itself state what kind of service the application is requesting. Instead, the CoS is simply a marking that has mutual agreement between the application and network on its semantics.

Delay Budget Forwarding

The techniques herein propose a different approach for specifying service levels for delay-sensitive traffic. In particular, rather than utilizing a CoS marking, the techniques herein involve marking each packet with a delay budget that forwarders process hop-by-hop. By including a delay budget, an application 248 can explicitly indicate the required service level for a particular packet without relying on the CoS level of indirection. Furthermore, as described in the details that follow, this mechanism allows the network to dynamically adapt to time-varying application requirements and network characteristics.

In particular, according to one or more embodiments herein, forwarding packets based on a delay budget may be achieved by including a per-packet delay budget directly in the packet itself, subtracting the communication delay incurred at each hop, computing multiple routing topologies with different path delays, choosing an appropriate routing topology when forwarding a packet based on the delay budget within the packet, and, optionally, dynamically allocating and releasing resources at the PHY/MAC layer to adjust the path delays for different routing topologies based on observed state when forwarding packets with delay budgets.

Said differently, according to one or more specific embodiments of the disclosure as described in detail below, certain nodes in a computer network maintain a plurality of routing topologies, each associated with a different corresponding delay. Upon receiving a packet with an indicated delay budget at a particular node, the node updates the delay budget based on an incurred delay up to and including the particular node since the indicated delay budget was last updated, and selects a particular routing topology on which to forward the packet based on the updated delay budget and the corresponding routing topology delays. The packet may then be forwarded with the updated delay budget on the selected routing topology, accordingly.

Illustratively, the techniques described herein may be performed by hardware, software, and/or firmware, such as in accordance with the delay process 212, which may contain computer executable instructions executed by a processor (e.g., specific to the network interface 210 or else a centralized processor 220) to perform functions relating to the novel techniques described herein, e.g., in conjunction with one or more applications 248. For example, the techniques herein may be treated as extensions to conventional protocols, such as the various PHY and/or MAC communication protocols (or other network-layer protocols), and as such, may be processed by similar components understood in the art that execute those protocols, accordingly.

Figure 3:
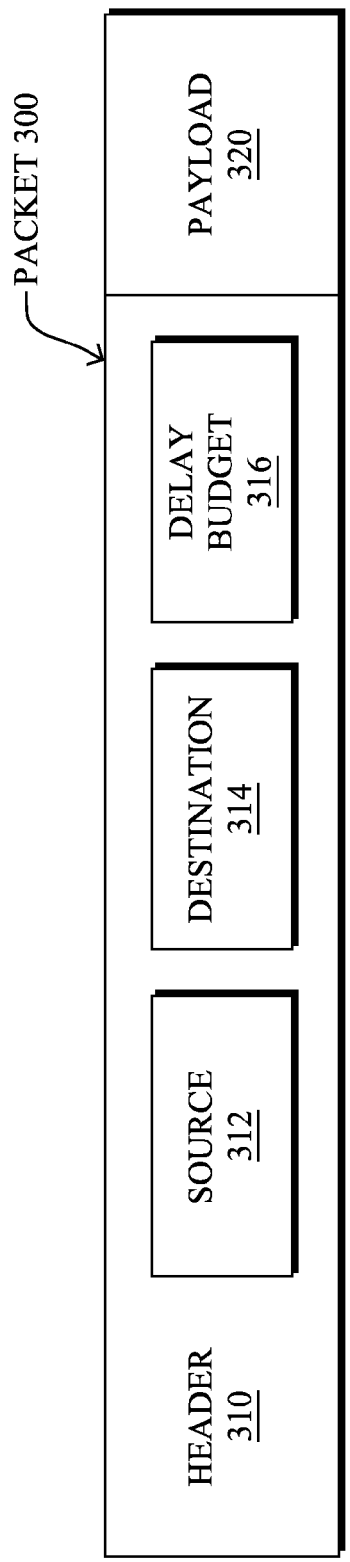
FIG. 3 illustrates an example packet.

Operationally, a first component of the techniques herein consists of marking each packet with a delay budget. FIG. 3 illustrates a simplified view of a packet as may be appreciated by those skilled in the art, and extended according to the techniques herein. In particular, a packet may generally comprise one or more headers 310 and a payload 320 containing the data/information to be transmitted. Within the header 310 is the information used to forward the packet, such as a source address 312, a destination address 314, and/or various encapsulation fields, error correction fields, checksums, etc. Additionally, for use as described herein, a "delay" field 316 may also be located within the one or more headers 310.

According to the techniques herein, when generating a packet, an application 248 may insert an acceptable communication delay (i.e., the "delay budget") for delivering the packet 300 to its destination. In a traditional network stack, the application layer may provide the delay budget when submitting a packet to the transport layer, e.g., based on determining the associated delay budget from the application 248 initiating the packet. Note that in one embodiment, this delay budget 316 field may be included using a new IPv6 Hop-by-Hop Option, or potentially within an existing packet field.

As described herein, when forwarding a packet 300, the forwarder subtracts the amount of delay incurred by the current hop. For example, to account for queuing delay (that is, associated with the forwarder between receiving the packet and forwarding the packet), the forwarder may timestamp the packet upon receiving it, take another timestamp before sending it, and subtracts the difference from the delay budget included in the packet. To account for transmission delay to reach the forwarder (in addition or alternatively), a previous hop (previous forwarder) may timestamp the packet before transmission, and the receiving node (forwarder) may record the timestamp after receiving the packet, and then subtracts the difference from the delay budget included in the packet. In this manner, the receiving node may determine the time to reach the node itself since the indicated delay budget was last updated (e.g., particularly in the event the previous hop was not a node that included a timestamp, as detailed below). Note that this embodiment generally requires neighboring devices to be time synchronized, though it should also be noted that this is common for devices in many networks, such as in channel-hopping (frequency-hopping) packet networks. Other methods (e.g., Network Time Protocol, "NTP") may also be used to achieve time synchronization.

In effect, the delay budget is updated at each (so configured) hop to indicate the remaining amount of delay the packet can incur in order to satisfy the application's request. In other words, upon receiving a packet with an indicated delay budget 316 at a particular node, the delay budget is updated based on an incurred delay up to and including the particular node since the indicated delay budget 316 was last updated. As described below, this delay budget is used to drive forwarding decisions at each hop, that is, to select a particular routing topology (of a plurality of routing topologies) on which to forward the packet based on the updated delay budget and corresponding routing topology delays.

It is worth noting that the techniques herein are not proposing modification to the routing decision algorithms according to a delay routing metric. Instead, the techniques herein select pre-computed routing topologies based on the delays to reach destinations using a particular topology (e.g., specifically known delays, or else hierarchical levels of general delay sensitivity). Note also that this delay budget approach dramatically differs from existing techniques that use CoS markings to classify packets, since for CoS markings to be effective, the network must be manually provisioned to meet particular SLAs for each CoS.

According to one or more embodiments herein, a second component involves maintaining a plurality of routing topologies within a computer network, each of the routing topologies associated with a different corresponding delay. Specifically, the network nodes (e.g., routing process 244) may thus be configured to compute different routing topologies (RTs) to achieve different path delays, e.g., a plurality of routing topologies with different delays based on corresponding characteristic trade-offs. For example, a first routing topology with lower path delay may sacrifice other metrics (e.g., energy) to achieve a lower path delay. However, a routing topology with a higher path delay may incur higher path delays to avoid resource-constrained devices (e.g., battery-powered, memory-constrained, etc.).

Note that in one embodiment, each routing topology may associated with a particular delay sensitivity, e.g., a fast, medium, and slow (or any other variously defined delay sensitivities, such as very sensitive, moderately sensitive, or indifferent, etc.), while in another embodiment, the corresponding delay associated with the routing topologies are particular to one or more specific destinations within the computer network. For example, each node may need to only compute a delay to one or more root nodes, or one or more other nodes of interest (e.g., aggregators, collectors, etc.). For instance, many Smart Grid or sensor network topologies are multi-point-to-point (MP2P) topologies, and as such, each node need only compute the delay for each topology to the single point.

Figure 4A:
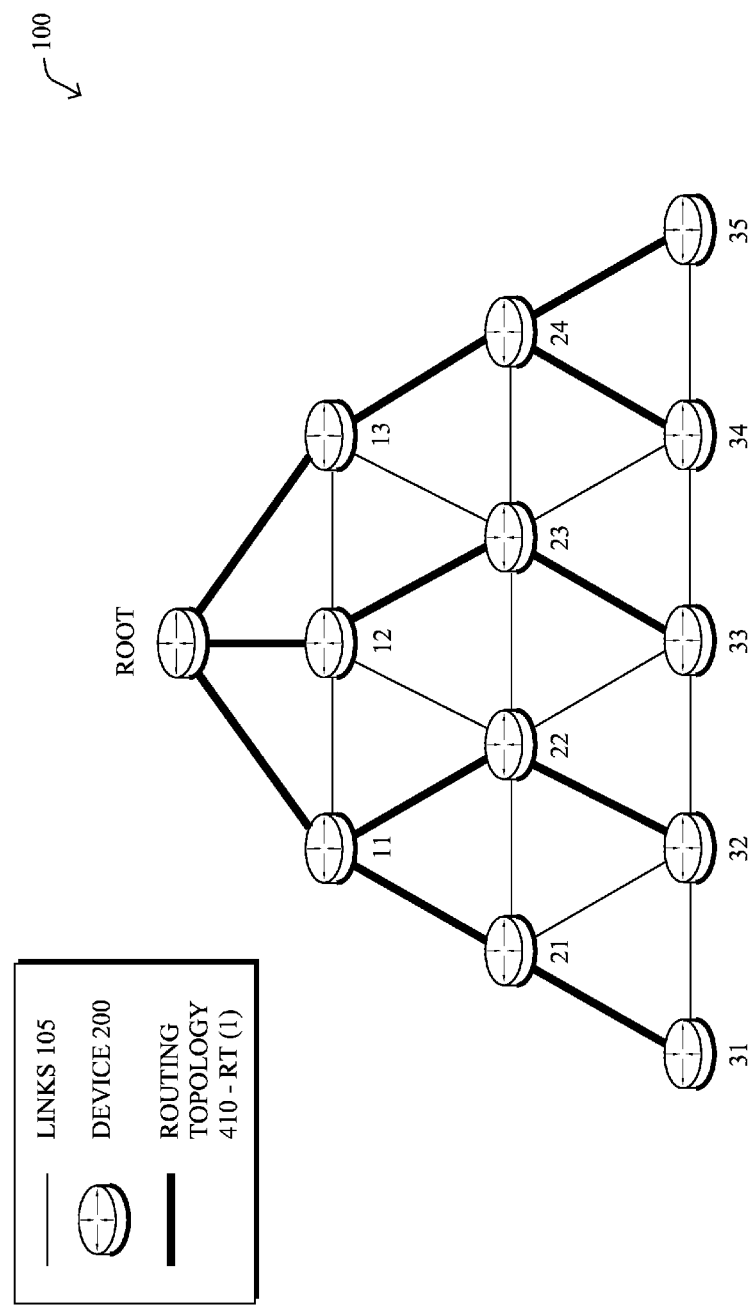
FIGS. 4A-4C illustrate example delay based routing topologies in the computer network of FIG. 1.
Figure 4B:
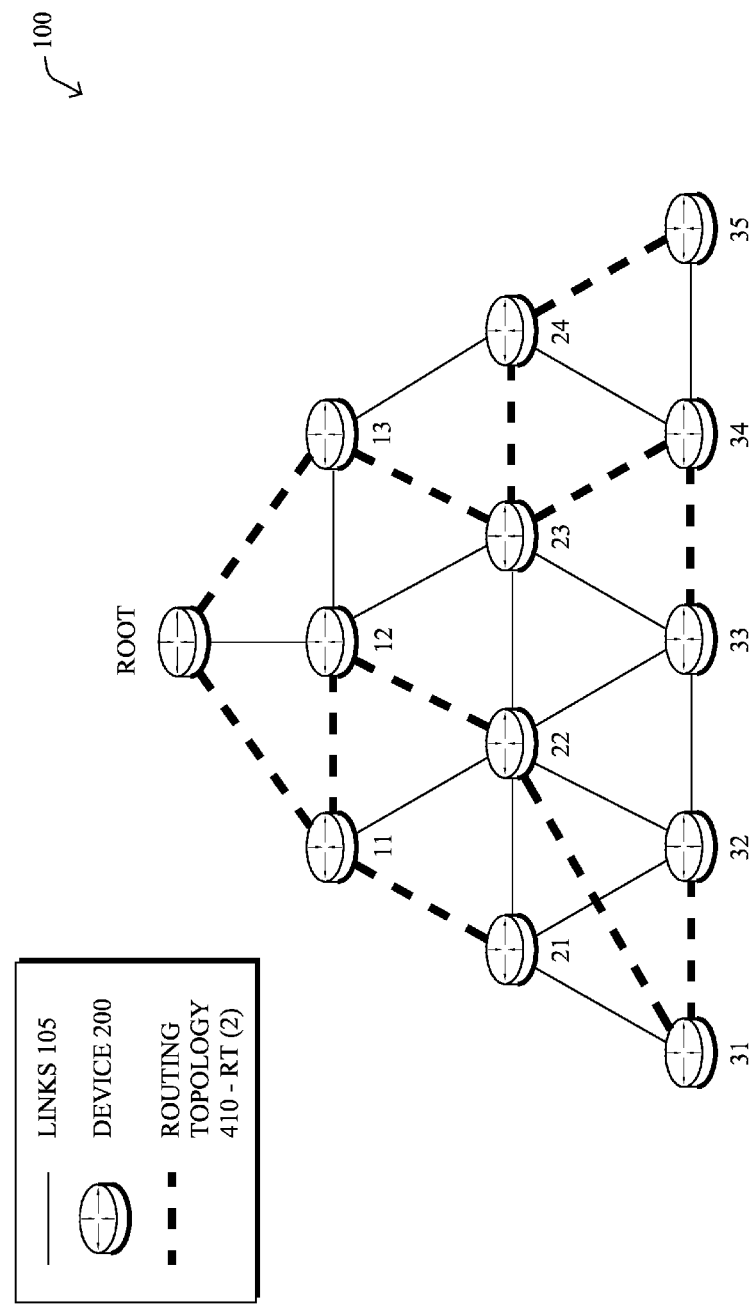
Figure 4C:
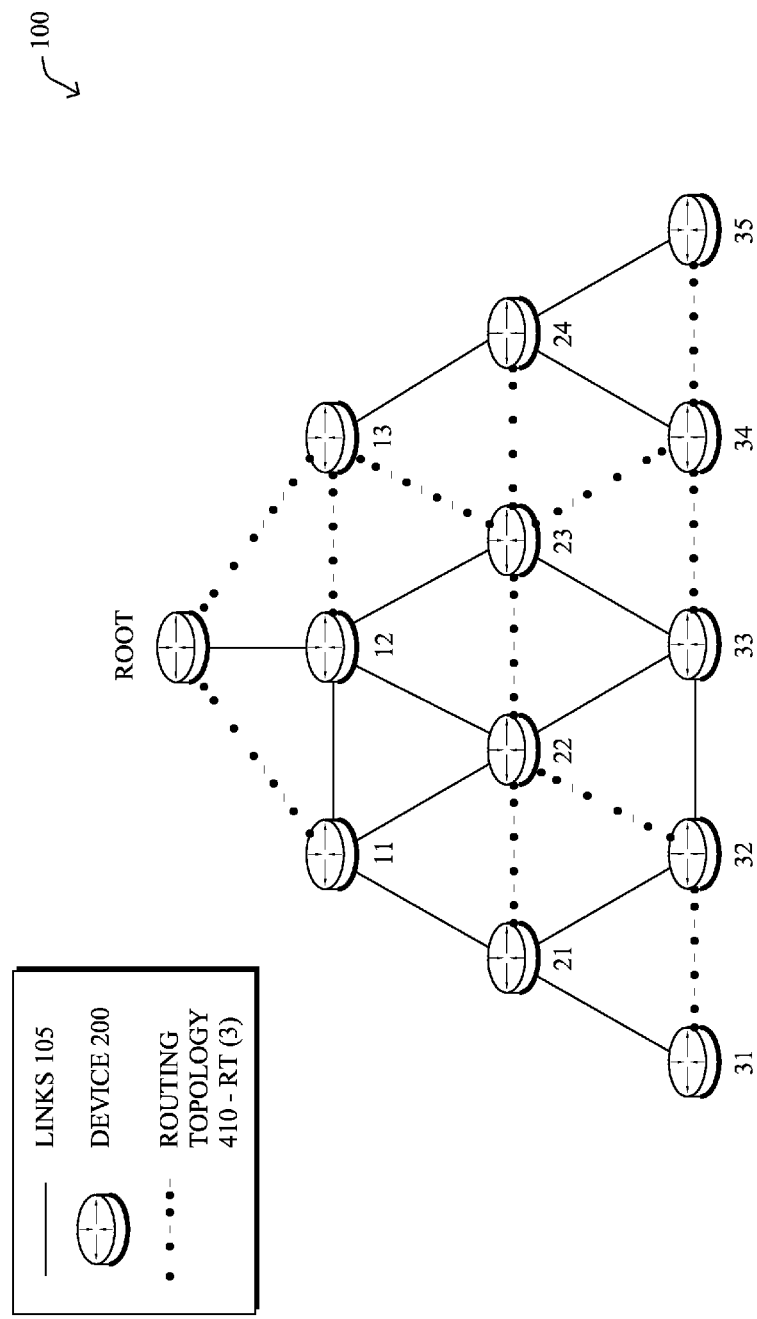

As shown in FIGS. 4A-4C, the network computes a path delay along a set of N routing topologies 410, "RT(1)," "RT(2)," "RT(3)," etc. (shown in FIGS. 4A, 4B, and 4C, respectively). Note that each of the different topologies as shown need not be link diverse (and are generally not node diverse, as the intention is not diversity, and each node should have connectivity). In particular, the links may be shared with the same associated delay (e.g., shared queues), and the delay may be based on using different links to different nodes, or else the same links (or different links) may be associated with different delays based on various internal resources dedicated to the packet flows, such as forwarding queues, processing pipelines, etc.

For example, a protocol such as RPL has the ability to compute multiple DAGs ("instances" in RPL terminology) where each DAG is optimized according to one or metrics and constraints. In the context of the embodiments herein, each DAG may be optimized for the path delay metric, but may utilize different constraints (e.g., little or no constraints for the RT that provides minimal path delay and one or more constraints for the RT that provides some additional delay). Alternatively, the techniques herein may use other known techniques to provide different routing topologies, such as MTR approaches in OSPF or ISIS, etc.

In one embodiment, the network may perform dynamic resource allocation to achieve a lower or higher path delay for a routing topology. In particular, devices may locally monitor the traffic flowing through and determine whether or not the requested delay budgets are being met. If the delay budgets are not being met for a proportion of traffic (said differently, detecting that a proportion of delay budgets not satisfied is above a threshold), the device may request additional resources to achieve a lower delay bound (reduce the corresponding delays). For example, the device may allocate (or request allocation of) additional communication slots in a time-synchronized network (e.g., frequency-hopping timeslots), a number of queuing buffers, etc. In one specific embodiment, the device may also request change (e.g., relaxation) of a routing topology determination constraint, such as whether energy constrained devices may be used, etc. Note also that conversely, if the delay budgets are being met with sufficient margin (e.g., a proportion satisfied above a threshold), the device may release (or request release of) resources to reduce resource consumption, and to thus relax the corresponding associated delays for the routing topologies as they are not needed at the time. In still another embodiment, a central device (e.g., a root node, a Network Management System or "NMS," a head-end application, etc.) may collect information from routers such as the proportion of packets with unsatisfied delay requirements and may allocate (or release) resources as needed to achieve the appropriate path delay for each routing topology.

According to the embodiments herein, when forwarding a packet, the forwarder subtracts the communication delay incurred by the current hop from the delay budget 316, and by inspecting the remaining delay budget, the forwarder will determine what routing topology to use in order to meet the remaining delay budget for the packet 300.

Figure 5A:
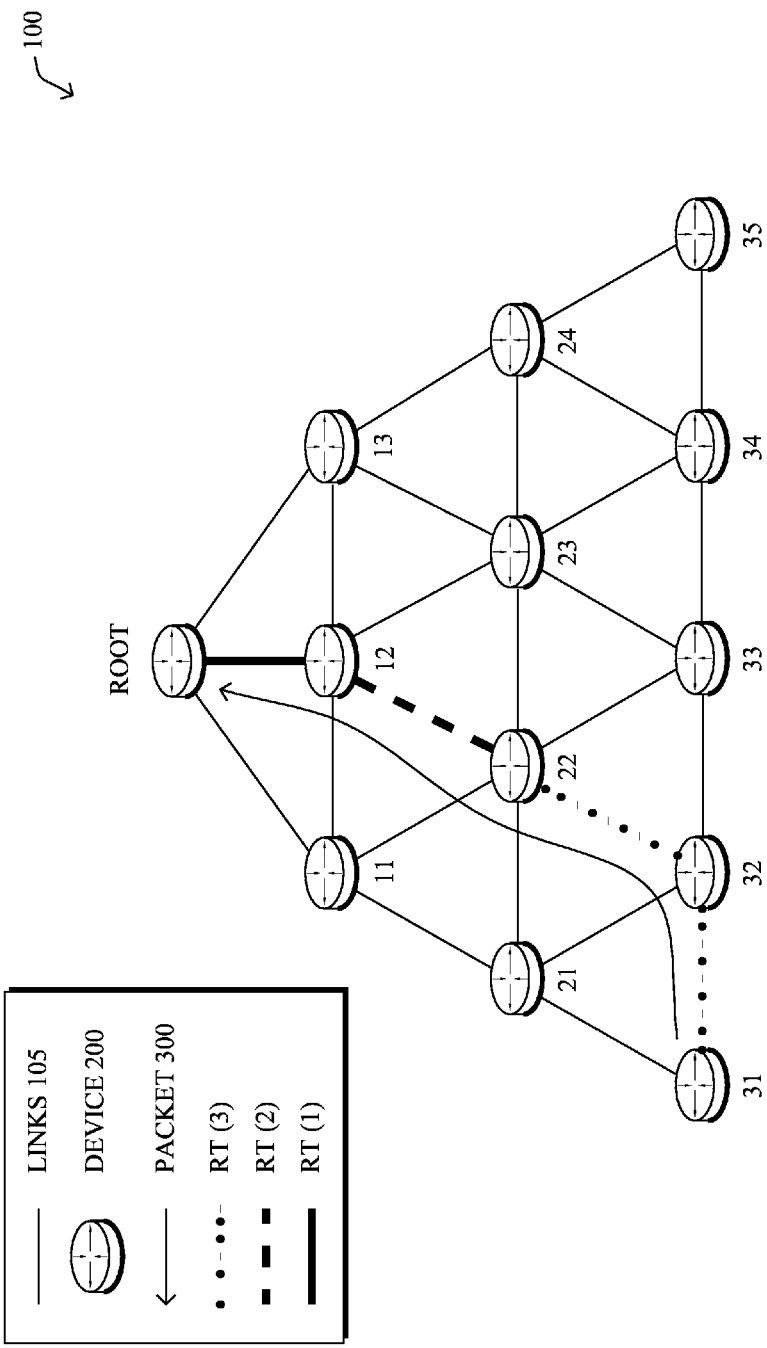
FIGS. 5A-5B illustrate examples of delay budget based packet forwarding in the computer network.
Figure 5B:
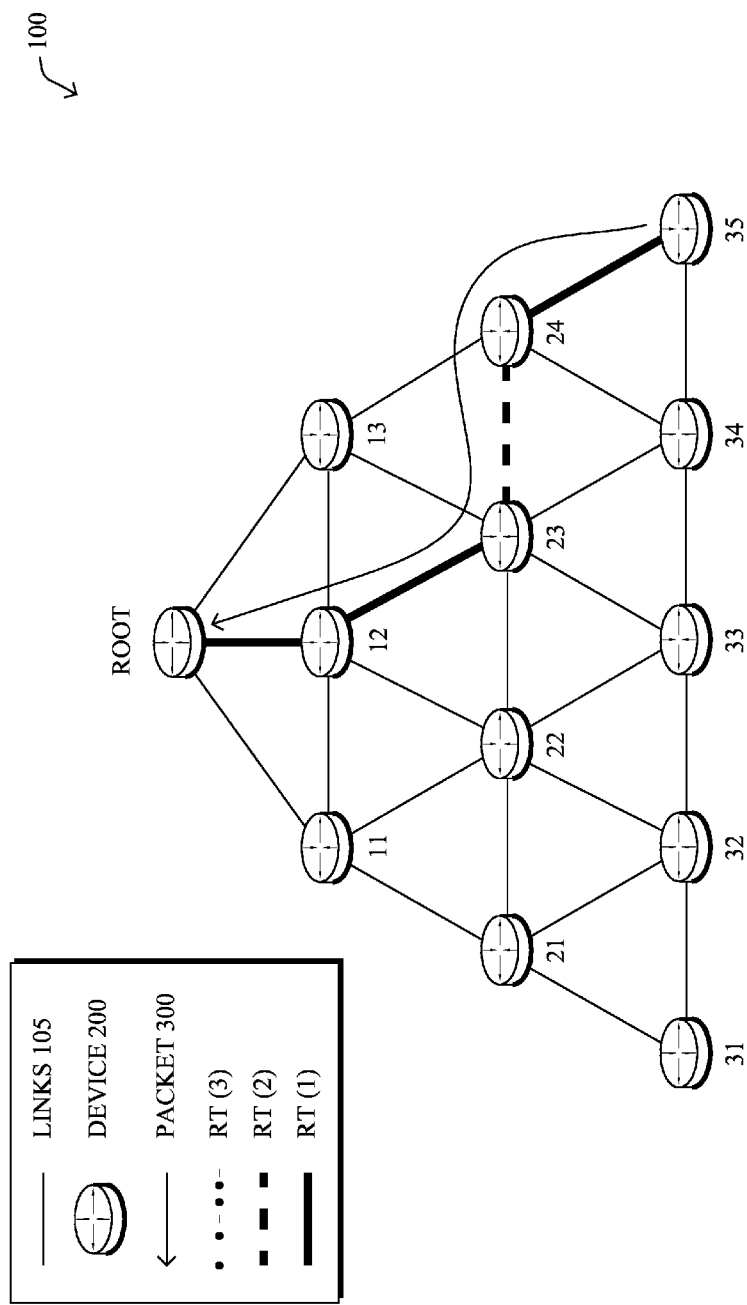

FIGS. 5A and 5B illustrate examples of packet processing in accordance with one or more embodiments herein. For instance, as shown in FIG. 5A, assume that node 31 (e.g., an application 248 on node 31) generates a packet 300 with a given delay budget that node 31 assumes can be met by forwarding it on the routing topology RT(3) to the root node. Accordingly, node 32 receives the packet, updates the delay budget (based on the transmission to node 32, and the processing by node 32), and determines still that RT(3) is suitable. Once at node 22, however, perhaps an exceptional delay has occurred in the network, and node 22's assessment of the updated delay budget 316 in the packet is that RT(3) is no longer suitable. As such, node 22 may switch the packet to RT(2). Note that routing topology changes need not be incremental, and nodes may immediately select an appropriate topology. Once at node 12 on RT(2), node 12 may further assess the delay budget 316 as not suitable for RT(2), and may forward the node directly to the root device on RT(1).

Note further that while in many configurations, there is little need for a node in communication with the root to have different topologies to the root node, such as shared-media networks operating on the same channel, various other techniques may actually allow and benefit from having multiple topologies, such as wired networks, independent pair-wise frequency-hopping sequence networks, etc., and as such, it cannot be assumed that any transmission from nodes 11, 12, or 13 will be heard by the root device, and as such, nodes 11, 12, and 13 may have different resources (e.g., queues) allocated to reaching the root node, accordingly.

If the forwarder does not have a routing topology that can satisfy the delay budget, thus determining a condition that there is no routing topology to satisfy the updated delay budget, the forwarder may record the condition and forward the packet along the best routing topology available (i.e., one with a shortest delay). Also, if the forwarder notices that the condition occurs too frequently, it may trigger the allocation of additional resources (e.g., additional communication slots, additional queuing buffers, etc.) to achieve lower path delays, as noted above. Further, where the associated delays are specific to a particular destination, and are not simply a hierarchical level of delay sensitivity, if it is determined that there is no known delay for a particular destination 314 of the packet 300, e.g., if the only known destination is the root node, and the packet is destined to node 34, then the packet may be forwarded on a default routing topology (such as, depending upon network configuration, the slowest, the fastest, or any particular routing topology in between).

Also, FIG. 5B illustrates another example of packet processing, for example, where there is excess delay budget in the packet for a particular routing topology. For instance, assume that node 35 initiates a packet 300 with an associated delay budget 316. If node 35 determines that routing topology RT(1) is needed to reach the root in time, then the packet may be forwarded on RT(1) directly to node 24. Once at node 24, however, perhaps due to over-estimation of the actual delay or due to a change (reduction) in the delay to reach node 24 (or for node 24 to process the packet), then node 24 may redirect the packet onto a longer-delayed routing topology, RT(2), and forwards the packet to node 23. However, once at node 23, an additional delay may be encountered than what was expected by node 24, and node 23 may decide to place the packet back on the faster topology RT(1), and the packet is sent directly to the root node, hopefully before expiration of the associated delay budget 316.

Notably, in an illustrative embodiment, each node in the network 100 is configured to forward the packets 300 based on a delay budget. However, in an alternative embodiment, only a subset of all nodes in the computer network 100 are configured to update the delay budget and select routing topologies on which to forward the packet. In this instance, as noted above, the delay budget 316 is updated based on the incurred delay since the indicated delay budget was last updated by another node of this limited subset.

Figure 6:
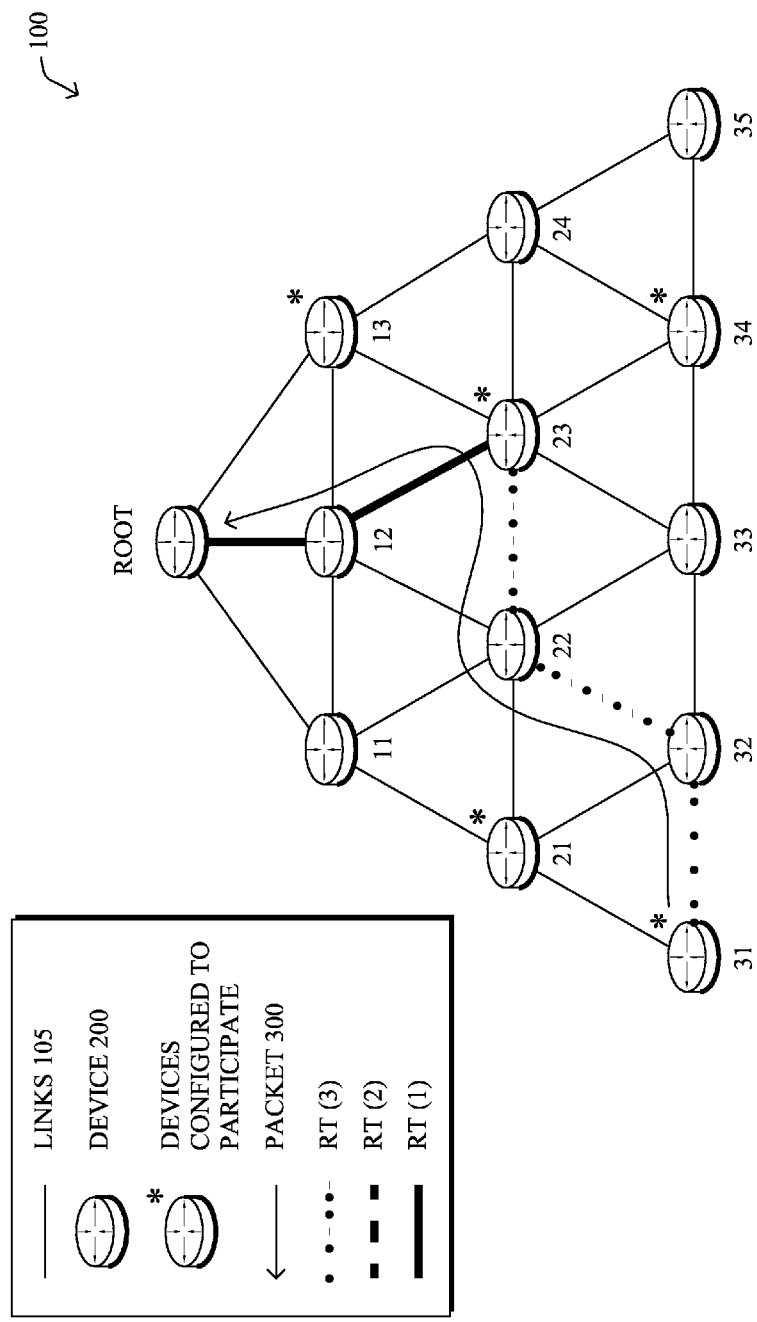
FIG. 6 illustrates an example of limited delay budget application in the computer network.

FIG. 6 illustrates an example of this alternative embodiment, where only nodes 31 and 23 of a particular packet's path are configured to perform delay budget based routing. For instance, node 31 may select a particular topology (e.g., RT(3) based on a long delay budget), forwarding the packet 300 to node 32. From node 32, following RT(3) results in the packet being forwarded to node 22, and then 23, each merely forwarding the packet in a conventional manner, without any regard to the delay (i.e., on the same topology on which the packet was received). Once at node 23, however, the delay budget 316 may be updated, and it may be determined that node 31's assessment of the delay along RT(3) had underestimated delay (e.g., due to variance in congestion, queue lengths, etc.). If node 23 determines that RT(3) is no longer suitable for the associated delay budget 316 of the packet, node 23 may then select an appropriate routing topology, e.g., RT(1), and thus attempts to forward the packet toward the destination within the indicated delay budget, accordingly.

Figure 7:
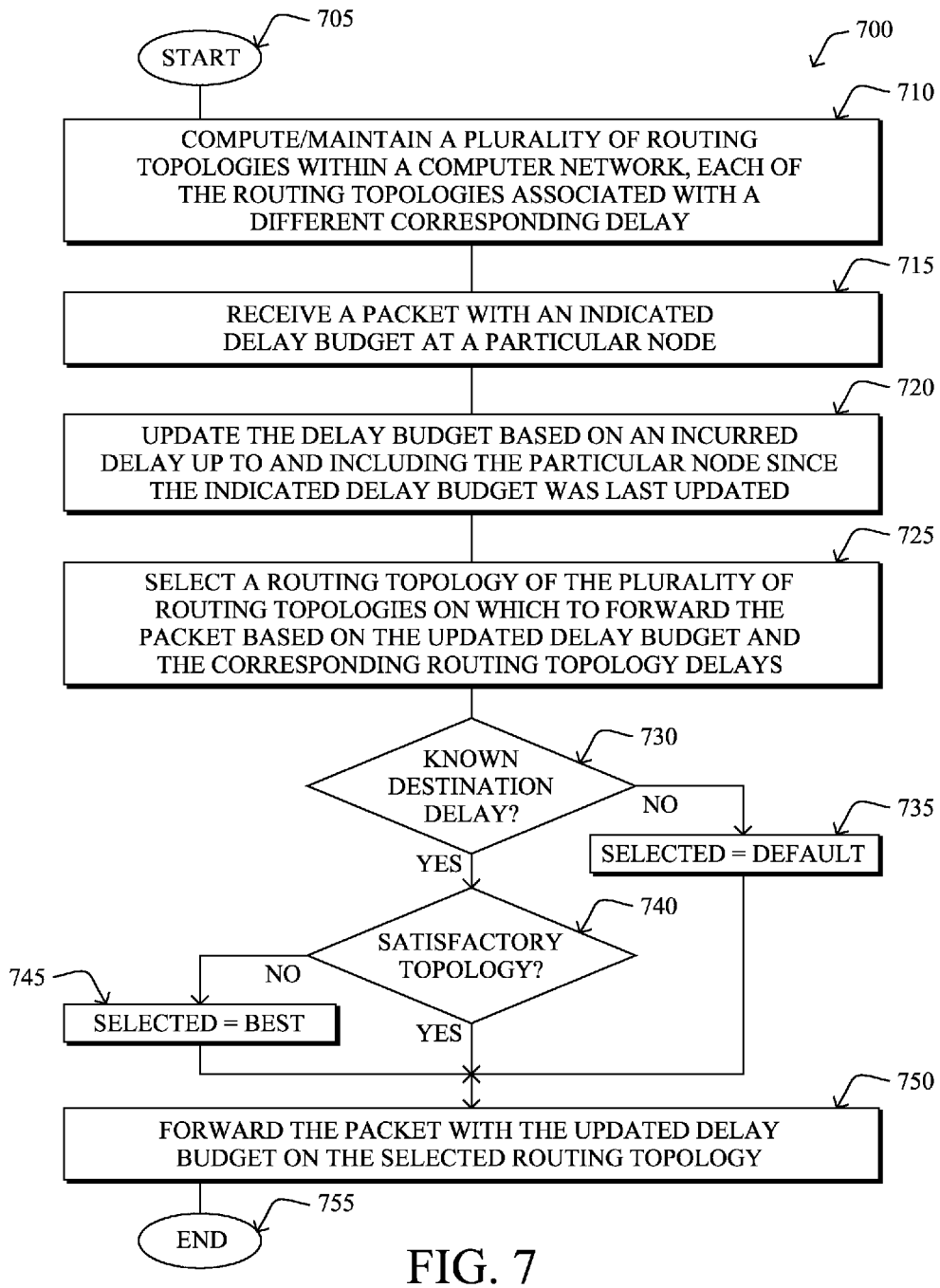
FIG. 7 illustrates an example simplified procedure for delay budget based forwarding in the computer network.

FIG. 7 illustrates an example simplified procedure for delay budget based forwarding in a computer network in accordance with one or more embodiments described herein. The procedure 700 starts at step 705, and continues to step 710, where, as described in greater detail above, a node in a network 100 computes or maintains a plurality of routing topologies 410, each of the routing topologies associated with a different corresponding delay. Upon receiving a packet 300 in step 715, that is, one with an indicated delay budget 316, the particular node updates the delay budget in step 720 based on an incurred delay up to and including the particular node since the indicated delay budget was last updated, as detailed above.

Based on the updated delay budget and the corresponding routing topology delays, in step 725 the receiving node selects a specific on which to forward the packet. Note that as described above, in the event there is no known destination delay in step 730, then in step 735 a default topology is selected. Also, if in step 740 there is no satisfactory topology, then in step 745 a best topology may be selected, e.g., and the occurrence may be recorded in order to maintain network resources accordingly. In step 750, the packet 300 is forwarded with the updated delay budget 316 on the selected routing topology, and the procedure 700 ends in step 755, notably with the opportunity to revise routing topologies or receive further packets with/without revising routing topologies, accordingly.

Figure 8:
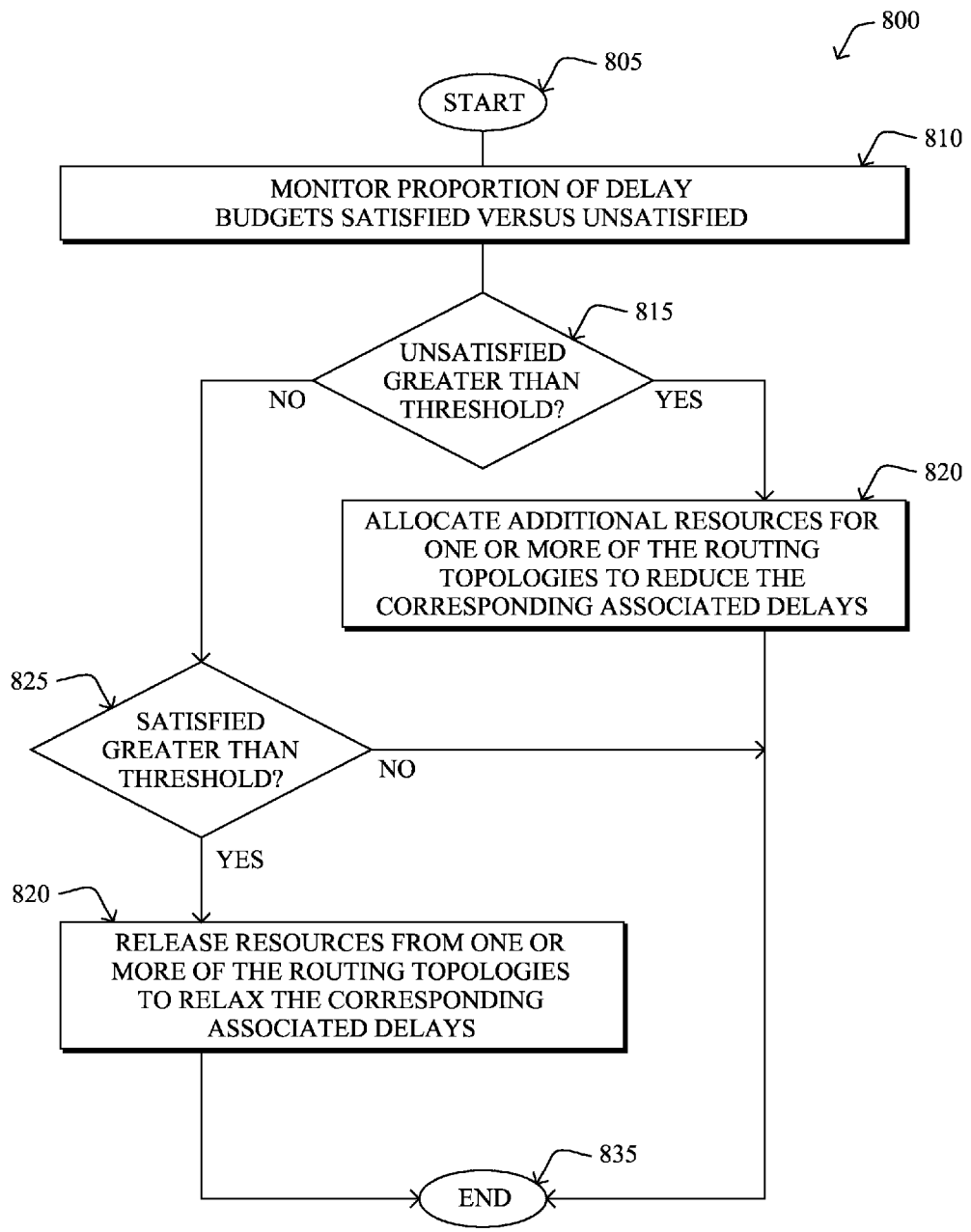
FIG. 8 illustrates another example simplified procedure for delay budget based forwarding in the computer network, particularly regarding the management of network resources.

In addition, FIG. 8 illustrates another example simplified procedure for delay budget based forwarding in a computer network in accordance with one or more embodiments described herein, particularly regarding the management of network resources. That is, the procedure 800 dynamically adjusts resource allocation for one or more of the routing topologies based on at least of either a proportion of satisfied delay budgets and a proportion of unsatisfied delay budgets. Specifically, procedure 800 starts at step 805, and continues to step 810, where, as described in greater detail above, the proportion of delay budgets satisfied versus unsatisfied is monitored. If the proportion (or number) of unsatisfied budgets crosses a configured threshold in step 815, then in step 820 additional resources may be allocated (e.g., requested) for one or more of the routing topologies 410 to reduce the corresponding associated delays, as previously described in detail. Conversely, if in step 825 the proportion of satisfied delay budgets is greater than some specified threshold, then in step 830 one or more resources may be released from one or more of the routing topologies to relax the corresponding associated delays. The procedure 800 illustratively ends in step 835, though may continue to monitor for satisfied and unsatisfied delay budgets during the processing of delay budget based forwarding in the computer network.

Figure 9:
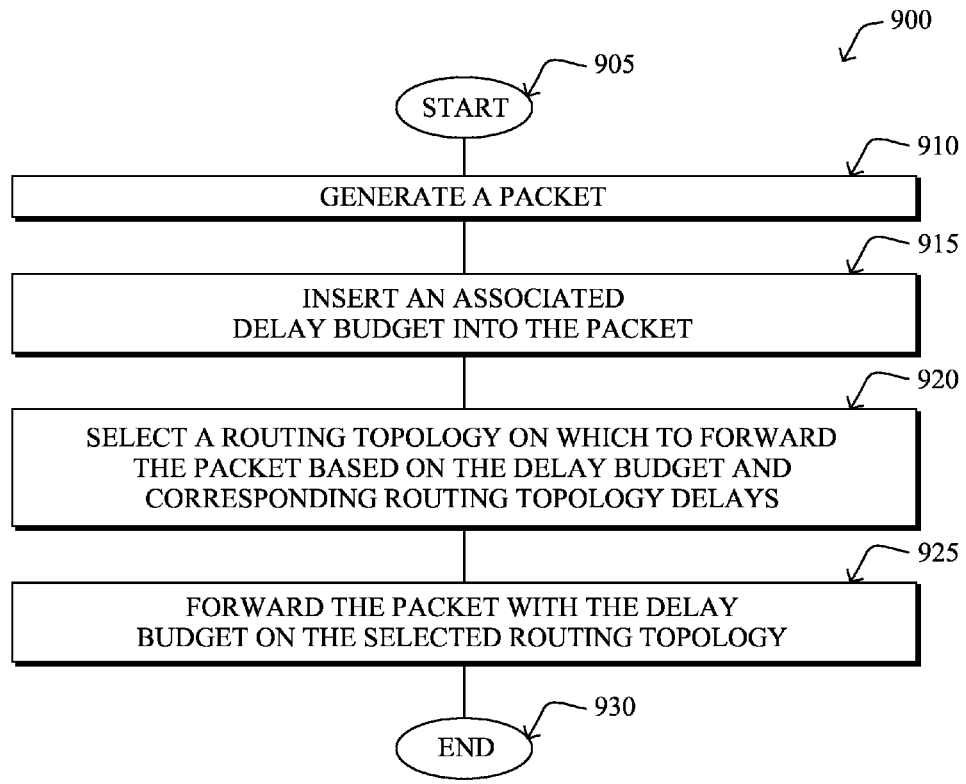
FIG. 9 illustrates another example simplified procedure for delay budget based forwarding in the computer network, particularly for initiating a packet into the network with a delay sensitivity.

Moreover, FIG. 9 illustrates another example simplified procedure for delay budget based forwarding in a computer network in accordance with one or more embodiments described herein, particularly for initiating a packet into the network with a delay sensitivity. The procedure 900 starts at step 905, and continues to step 910, where, as described in greater detail above, a delay sensitive packet 300 may be generated, e.g., in response to a request from an application 248. An associated delay budget 316 may be then be inserted into the packet in step 915, and in step 920 the generating node selects a routing topology 410 on which to forward the packet based on the delay budget and corresponding routing topology delays. Accordingly, as described above, the node forwards the packet with the delay budget in step 925 on the selected routing topology. The procedure 900 ends in step 930, and may restart in response to a newly generated packet.

It should be noted that while certain steps within procedures 700-900 may be optional as described above, the steps shown in FIGS. 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-900 are described separately, certain steps from each procedure may be incorporated into each other procedure, and the procedures are not meant to be mutually exclusive.

The novel techniques described herein, therefore, provide for delay budget based forwarding in a computer network. In particular, by forwarding packets based on a delay budget as described above, the techniques herein allow for efficient network performance management, and allow dynamic resource allocation based on observed network state and the observed traffic characteristics, thus reducing the amount of manual configuration required. In addition, the techniques herein classify packets using a simple delay budget indication, rather than Class of Service (CoS) marking, thus dramatically simplifying the configuration and provisioning of the network. Note also that while MTR in classic IP networks is optimized against a specific routing metric (e.g., delay, bandwidth, etc.), the packets in classic IP MTR are not switched between delay-based topologies according to a required delay budget, as described herein.

While there have been shown and described illustrative embodiments that provide for delay budget based forwarding in a computer network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of constrained networks and/or associated protocols. In addition, the techniques above are not limited to wireless or other shared-media communication (e.g., PLC), and may be applied to wired networks as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   maintaining a plurality of routing topologies within a computer network, each of the routing topologies associated with a different corresponding delay;
   receiving a packet with an indicated delay budget at a particular node;
   updating the delay budget by subtracting an incurred delay up to and including the particular node since the indicated delay budget was last updated, wherein the incurred delay includes a queuing delay at the particular node between receiving the packet and forwarding the packet away from the particular node;
   selecting a particular routing topology of the plurality of routing topologies on which to forward the packet based on the updated delay budget and the corresponding routing topology delays; and
   forwarding the packet with the updated delay budget on the particular routing topology.

2. The method as in claim 1, wherein the corresponding delay associated with the routing topologies are particular to one or more specific destinations within the computer network, and wherein selecting the particular routing topology comprises:
   determining that there is no known delay for a particular destination of the packet; and
   in response, forwarding the packet on a default routing topology.

3. The method as in claim 1, further comprising, in response to determining a condition that there is no routing topology to satisfy the updated delay budget:
   selecting a particular routing topology of the plurality of routing topologies with a shortest delay; and
   recording the condition.

4. The method as in claim 1, further comprising:
dynamically adjusting resource allocation for one or more of the routing topologies based on at least of either a proportion of satisfied delay budgets and a proportion of unsatisfied delay budgets.

5. The method as in claim 4, wherein resource allocation is selected from a group consisting of: a number of communication slots in a frequency hopping sequence; a number of queuing buffers, and one or more routing topology determination constraints.

6. The method as in claim 1, further comprising:
detecting that a proportion of delay budgets not satisfied is above a threshold; and
in response, allocating additional resources for one or more of the routing topologies to reduce the corresponding associated delays.

7. The method as in claim 1, further comprising:
detecting that a proportion of delay budgets satisfied is above a threshold; and
in response, releasing resources from one or more of the routing topologies to relax the corresponding associated delays.

8. The method as in claim 1, wherein updating the delay budget comprises subtracting at least one of either a transmission delay to reach the particular node since the indicated delay budget was last updated and a queuing delay associated with the particular node between receiving the packet and forwarding the packet.

9. The method as in claim 1, further comprising:
computing the plurality of routing topologies with different delays based on corresponding characteristic tradeoffs.

10. The method as in claim 1, wherein the routing topologies are selected from a group consisting of: directed acyclic graph (DAG) instances; and multi-topology routing (MTR) instances.

11. The method as in claim 1, further comprising:
generating a second packet by the particular device;
inserting an associated delay budget into the second packet; and
forwarding the second packet.

12. The method as in claim 11, further comprising:
determining the associated delay budget from an application initiating the packet at the particular node.

13. The method as in claim 1, wherein the particular node is a first node of a subset of all nodes in a computer network that are configured to update the delay budget and select routing topologies on which to forward the packet, and wherein the delay budget is updated based on the incurred delay since the indicated delay budget was last updated by a second node of the subset.

14. An apparatus, comprising:
one or more network interfaces to communicate in a computer network;
a processor coupled to the network interfaces and adapted to execute one or more processes; and
a memory configured to store a process executable by the processor, the process when executed operable to:
maintain a plurality of routing topologies within the computer network, each of the routing topologies associated with a different corresponding delay;
receive a packet with an indicated delay budget;
update the delay budget by subtracting an incurred delay up to and including the apparatus since the indicated delay budget was last updated, wherein the incurred delay includes a queuing delay at the particular node between receiving the packet and forwarding the packet away from the particular node;
select a particular routing topology of the plurality of routing topologies on which to forward the packet based on the updated delay budget and the corresponding routing topology delays; and
forward the packet with the updated delay budget on the particular routing topology.

15. The apparatus as in claim 14, wherein the corresponding delay associated with the routing topologies are particular to one or more specific destinations within the computer network, and wherein the process when executed to select the particular routing topology is further operable to:
determine that there is no known delay for a particular destination of the packet; and
in response, forward the packet on a default routing topology.

16. The apparatus as in claim 14, wherein the process when executed is further operable to:
determine a condition that there is no routing topology to satisfy the updated delay budget; and
in response, select a particular routing topology of the plurality of routing topologies with a shortest delay and record the condition.

17. The apparatus as in claim 14, wherein the process when executed is further operable to:
dynamically adjust resource allocation for one or more of the routing topologies based on at least of either a proportion of satisfied delay budgets and a proportion of unsatisfied delay budgets.

18. The apparatus as in claim 14, wherein the process when executed to update the delay budget is further operable to:
subtract at least one of either a transmission delay to reach the apparatus since the indicated delay budget was last updated and a queuing delay associated with the apparatus between receiving the packet and forwarding the packet.

19. The apparatus as in claim 14, wherein the process when executed is further operable to:
generating a second packet by the particular device;
inserting an associated delay budget into the second packet; and
forwarding the second packet.

20. A tangible, non-transitory, computer-readable media having software encoded thereon, the software when executed by a processor on a particular node operable to:
maintain a plurality of routing topologies within the computer network, each of the routing topologies associated with a different corresponding delay;
receive a packet with an indicated delay budget;
update the delay budget by subtracting an incurred delay up to and including the particular node since the indicated delay budget was last updated, wherein the incurred delay includes a queuing delay at the particular node between receiving the packet and forwarding the packet away from the particular node;
select a particular routing topology of the plurality of routing topologies on which to forward the packet based on the updated delay budget and the corresponding routing topology delays; and
forward the packet with the updated delay budget on the particular routing topology.

* * * * *